H. H. STYLL.
WATCHMAKER'S LOUPE.
APPLICATION FILED DEC. 27, 1910.
1,098,413.
Patented June 2, 1914.
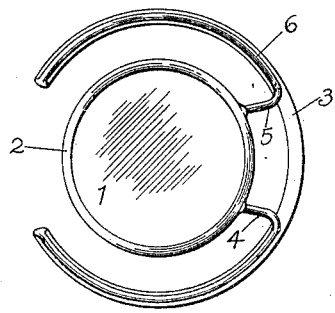
FIG. II
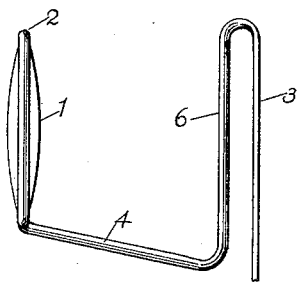
FIG. III
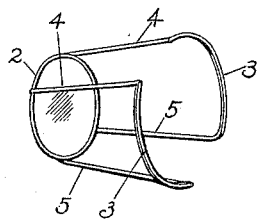
FIG. IV
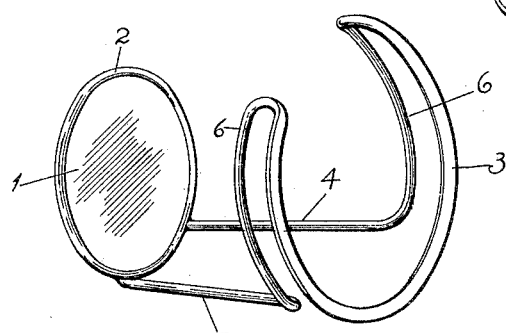
FIG. I
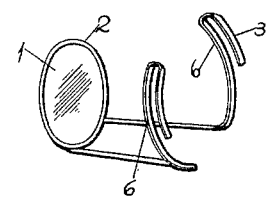
FIG. V
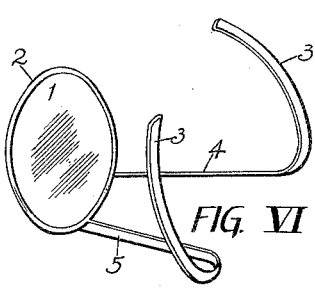
FIG. VI
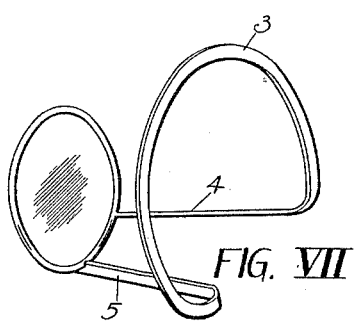
FIG. VII
WITNESSES:
Joseph J. Demers
Frederick G. Blanchard
INVENTOR
Harry H. Styll

UNITED STATES PATENT OFFICE.

HARRY H. STYLL, OF SOUTHBRIDGE, MASSACHUSETTS.

WATCHMAKER'S LOUPE.

1,098,413.      Specification of Letters Patent.      Patented June 2, 1914.

Application filed December 27, 1910. Serial No. 599,440.

*To all whom it may concern:*

Be it known that I, HARRY H. STYLL, a citizen of the United States, residing at Southbridge, in the county of Worcester and State of Massachusetts, have invented certain new and useful Improvements in Watchmakers' Loupes, of which the following is a specification.

My invention relates to watchmakers' loupes which are used by watchmakers, jewelers and others who require a magnifying glass which can be held in front of the eye by the adjacent muscles.

My invention comprises a frame adapted to retain the magnifying lens and a loupe attached to the lens frame and so folded as to form yielding means for engaging the muscles about the eye, the lens frame and the eye frame being arranged in substantially parallel planes.

The principal object of my invention is to provide yielding means adapted to assist the muscles of the eye in holding the eye frame in front of the eye.

Another object of my invention is to simplify and cheapen the construction of such an instrument by the elimination of soldered or brazed joints.

With these and other objects in view, the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of the drawings.

In the accompanying drawings: Figure I is a perspective of my invention. Fig. II is an end view of Fig. I looking through the lens toward the eye piece. Fig. III is a side elevation of Fig. I. Figs. IV, V, VI and VII show in perspective various modifications of my invention.

Referring to the drawings: A magnifying lens 1 held in a frame or rim 2 is supported in position before the eye by means of an open loupe 3 which is preferably flattened and made of a yielding material so that when slightly displaced it will have a tendency to spring back to normal position and thus aid the muscles of the eye in retaining it in place. The ends 4 and 5 of this open loupe are bent around to form a second fold 6 substantially parallel with the first fold 3 and then continued on and attached to the lens frame 2, the folds being arranged so that the eye frame 3 is substantially parallel with the lens frame 2 and thus adapted to hold the lens in alinement with the eye frame.

Fig. IV shows a modification wherein the eye frame 3 is open on both ends instead of on one end only as shown in Fig. I and the ends 4 and 5 are continued directly up to the lens frame 2 without being folded back into a second loupe parallel to the eye frame 3.

Fig. V shows a modification wherein the eye frame 3 is open at both sides but only one end of each side is carried up to and connected with the lens frame 2, the fold 6 being made substantially parallel with the eye frame 3, however, in a manner similar to that shown in Fig. I.

Fig. VI shows a modification wherein both sides of the eye frame 3 are open, one end only being continued up to and connected with the lens frame 2. In this modification there is no fold 6 parallel with the eye frame.

Fig. VII shows a modification wherein the eye frame 3 is open at one side only but without the parallel fold 6 shown in Fig. I.

The section of the loupe which forms the eye frame is preferably flattened so that it presents a sharper and better gripping edge to the muscles about the eye. This flattening process also stiffens the material, adapting it to resume its normal position when sprung therefrom.

The method of operation is as follows: When applying the eye frame 3 to the muscles about the eye in the usual well known manner, the open ends are to be pressed toward each other, thereby contracting the eye frame. After the eye frame has been adjusted in place and the muscles of the eye assume the position occupied in gripping the eye frame, the open ends of the eye frame will tend to spring out to assume their normal position and thereby aid the muscles in holding it in place, the flattened surface also providing a gripping edge found very adaptable for the purpose. Where the user of the loupe wears eyeglasses or spectacles, it need not be applied as described above but the lens of the eyeglass or spectacle may be embraced between the eye frame 3 and the parallel loupe 6 which are adapted to hold the loupe in alinement before the eye. It is, therefore, apparent that such a loupe may be used equally as well by an artisan wearing eyeglasses or spectacles as by one who does not.

It will be noted that various changes can be made in the method of folding the loupe forming the eye frame and its connection to the lens frame without departing from the spirit of my invention. I, therefore, do not desire to be strictly limited to the details shown and described.

Having thus described my invention what I claim as new and desire to secure by Letters Patent is:

1. The combination with a lens frame, of a pair of supports secured thereto near one side thereof, and segmental eye pieces carried by said supports, and located entirely to one side thereof whereby said eye pieces may be readily adjusted according to the requirements of the individual wearer.

2. A device of the character described including a lens, a pair of supports having their outer ends connected to the lens near one side thereof and having their opposite ends terminating in arcuate portions extending to the same side of the support as that on which the lens is located, said supports and arcuate members being formed from resilient material and the arcuate portions together forming a split eye piece, whereby the resiliency of the eye piece and supports therefor permit of ready adjustment of the size and shape of the eye piece.

3. The combination with a lens frame, of a pair of resilient supports secured thereto near one side thereof and having eye pieces extending from the terminal ends of the supports and disposed to one side thereof, said eye pieces each having one attached and one free end, whereby they may be temporarily adjusted relative to each other by bending or twisting of the supports.

4. The combination with a lens frame, of a pair of supports secured thereto near one side thereof, separate eye pieces carried by the supports, and reversely extending portions formed integral with the eye pieces and adapted to hook over a lens or support.

5. In a watchmaker's loupe an eye piece comprising a resilient split ring terminating in outwardly extending portions affording finger grips for adjustment of the eye piece.

6. An eye piece comprising a resilient open ring and spaced projections carried by the ends of the ring whereby grasping of the projections serves to decrease the size of the eye piece.

In testimony whereof I affix my signature in presence of two witnesses.

HARRY H. STYLL.

Witnesses:
JOSEPH J. DEMERS,
DUDLEY H. CLARKE.

Copies of this patent may be obtained for five cents each, by addressing the "Commissioner of Patents, Washington, D. C."